United States Patent [19]
Oskowsky et al.

[11] Patent Number: 6,078,167
[45] Date of Patent: *Jun. 20, 2000

[54] VOLTAGE UPCONVERTER FOR PORTABLE TIME DIVISIONAL MULTIPLE ACCESS RADIO

[75] Inventors: Mark Oskowsky, Newport Coast; Dmitriy Rozenblit, Irvine, both of Calif.

[73] Assignee: Conexant System, Inc., Newport Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/047,242

[22] Filed: Mar. 24, 1998

[51] Int. Cl.[7] .................................. G05F 1/10; G05F 1/40
[52] U.S. Cl. ............................................. 323/222; 323/273
[58] Field of Search ..................................... 323/222, 273, 323/225, 268

[56] References Cited

U.S. PATENT DOCUMENTS

| | | | |
|---|---|---|---|
| 4,642,550 | 2/1987 | Illuzzi et al. | 323/222 |
| 4,816,739 | 3/1989 | Sakurai et al. | 323/222 |
| 5,122,728 | 6/1992 | Ashley | 323/282 |
| 5,247,239 | 9/1993 | Yamamura et al. | 323/222 |
| 5,412,308 | 5/1995 | Brown | 323/267 |
| 5,736,841 | 4/1998 | Gucyski | 323/222 |
| 5,790,395 | 8/1998 | Hagen | 363/89 |
| 5,793,190 | 8/1998 | Sahlstrom et al. | 323/222 |

*Primary Examiner*—Peter S. Wong
*Assistant Examiner*—Bao Q. Vu
*Attorney, Agent, or Firm*—Price Gess & Ubell

[57] ABSTRACT

A voltage upconverter circuit wherein a switching voltage regulator circuit is used to charge a capacitor from a battery during an idle interval of portable phone transmission and wherein the charged capacitor is thereafter switched in series with the battery voltage for supply to a load during signal transmission, resulting in a smaller, less expensive and more efficient voltage upconverter circuit.

8 Claims, 2 Drawing Sheets

6,078,167

1

VOLTAGE UPCONVERTER FOR PORTABLE TIME DIVISIONAL MULTIPLE ACCESS RADIO

BACKGROUND OF THE INVENTION

1. Field of the Invention

The subject invention relates generally to portable radio telephone circuitry and more specifically to voltage upconverter circuitry which exhibits improved efficiency and facilitates circuit miniaturization.

2. Description of Related Art

Voltage upconverter circuits are conventionally used in portable TDMA radio products, such as portable telephones, to increase the voltage supplied by 3.5 volt batteries to a 5 volt level required by the transmitter power amplifier and other circuitry of the radio telephone. Such upconverter circuits employ switching voltage regulators and relatively large electrolytic capacitors and are relatively inefficient. It has appeared to the inventors that it would be desirable to improve the efficiency of such upconverter circuits, as well as reduce their size to contribute to further miniaturization of the circuitry.

OBJECTS AND SUMMARY OF THE INVENTION

It is therefore an object of the invention to improve radio telephone circuitry;

It is another object of the invention to improve voltage upconverter circuitry;

It is another object of the invention to facilitate miniaturization of voltage upconverter circuitry employed in portable telephones; and It is yet another object of the invention to improve the efficiency of upconverter circuits used in radio telephones.

According to the invention, a capacitor is connected in series with a battery. A switching voltage regulator charges the capacitor during the idle cycle of the signal transmission. During signal transmission, the switching regulator is disconnected from the circuit and the capacitor is switched in series with the battery. In this way, a voltage step-up function, for example, from 3 to 5 volts, is introduced across the load. The invention provides a considerable increase in efficiency in that considerably less power is consumed by the circuitry between the battery and the load. The invention also allows the use of smaller and less expensive parts without voltage supply performance degradation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

2

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a readily implementable and efficient voltage upconverter for a TDMA portable phone.

Figure 1:
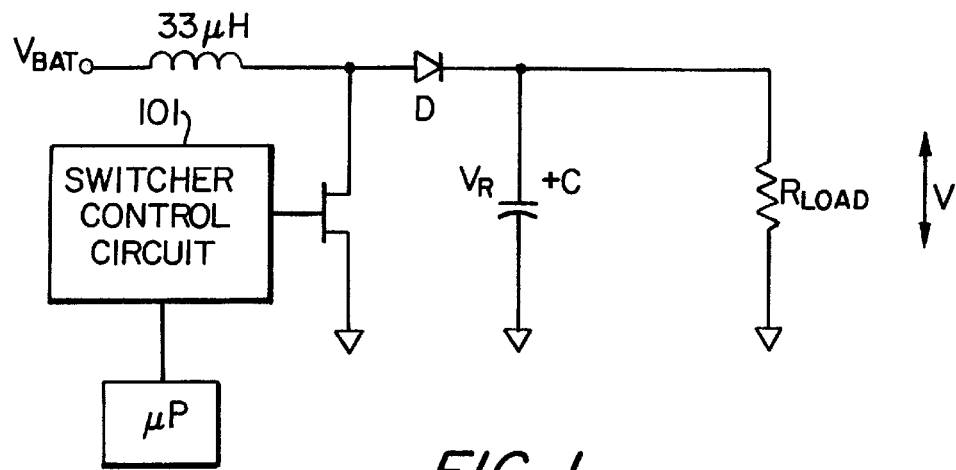
FIG. 1 is a circuit diagram illustrating a prior art voltage converter circuit.

FIG. 1 illustrates a prior art voltage converter circuit used in portable telephones. In this circuit, a capacitor C is connected in parallel with a load $R_{LOAD}$. A battery voltage $V_{BAT}$ is connected to a first terminal of an inductor L. A diode is connected between the capacitor C and the second terminal of the inductor L. The junction of the diode D and the inductor L is connected to one terminal of a transistor switch SW, which is switchable to ground by a switcher control circuit 101. In the circuit of FIG. 1, the capacitor C must carry the entire load voltage $V_R$ and hence must be relatively large in size.

Figure 2:
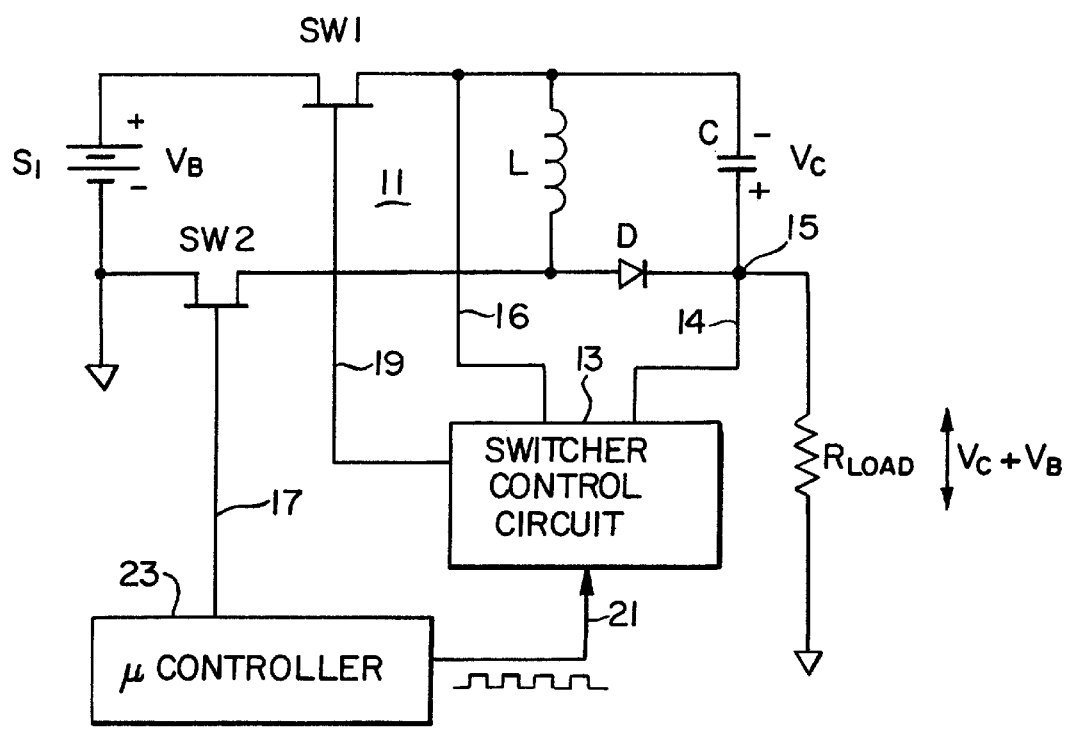
FIG. 2 is a circuit diagram illustrating voltage upconverter circuitry according to the preferred embodiment.

FIG. 2 illustrates the voltage upconverter circuit 11 according to the preferred embodiment. In this circuit, a battery $S_1$ has its negative terminal grounded and its positive terminal connected to the first terminal of a switch SW1. The second terminal of the switch SW1 is connected to the first terminal of an inductor L, the first terminal of a capacitor C, and the first terminal 16 of a conventional switching voltage regulator circuit 13. The second terminal of the capacitor C and the cathode of the diode D are connected to a second terminal 14 of the switching regulator circuit 13.

The junction 15 of the second terminal of the capacitor C, the cathode of the diode D and the second terminal 14 of the switching regulator circuit 13 is further connected to the first terminal of a load $R_{LOAD}$. The anode of the diode D is connected to the second terminal of the inductor L. The second terminal of the inductor L is further connected to the first terminal of a switch SW2. The switch SW2 has its second terminal connected to ground. Respective control signals are applied to respective third or control terminals 17, 19 of the two switches SW1, SW2.

In a portable telephone application, the control signals to the switch SW2 may be supplied by associated control circuitry, such as a microcontroller 23. In such an application, the load $R_{LOAD}$ comprises the power supply terminal of a transmit power amplifier and other circuitry. The switching voltage regulator circuit 13 may comprise a part No. LT13721377 or LT1371 as available from Linear Technologies, Inc. The voltage source $S_1$ may comprise one or more batteries.

The switching regulator circuit 13 functions to apply a voltage to the capacitor C required to charge the capacitor to $V_C$. Such a switching regulator circuit 13 may be turned "on" and "off," i.e., switched, by turning "on" and "off" a square wave clock signal supplied to it on its clock line 21, again preferably under microcontoller control. Alternatively, suitable switching circuitry may be provided to selectively connect and disconnect the switching regulator circuit 13 from its parallel connection to the capacitor C.

Figure 3:
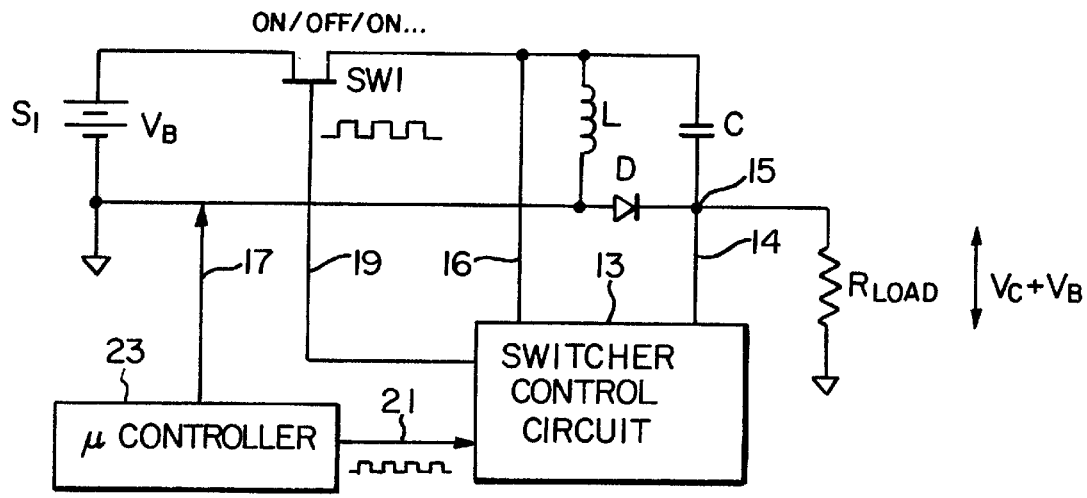
FIG. 3 is an equivalent circuit diagram illustrating operation of the circuit of FIG. 1 during the idle cycle of signal transmission.

In operation, during the idle phase of signal transmission, the first switch SW1 is alternately switched on and off by a square wave signal supplied by the switching regulator circuit 13, while the second switch SW2 is held closed by the microcontroller control signal on line 17. The resulting circuit is illustrated in FIG. 3. In the idle phase configuration of FIG. 3, the switching regulator circuit 13 charges the capacitor C to a voltage $V_C$. The idle phase may, for example, constitute the "idle" time slot of the GSM portable phone protocol.

Figure 4:
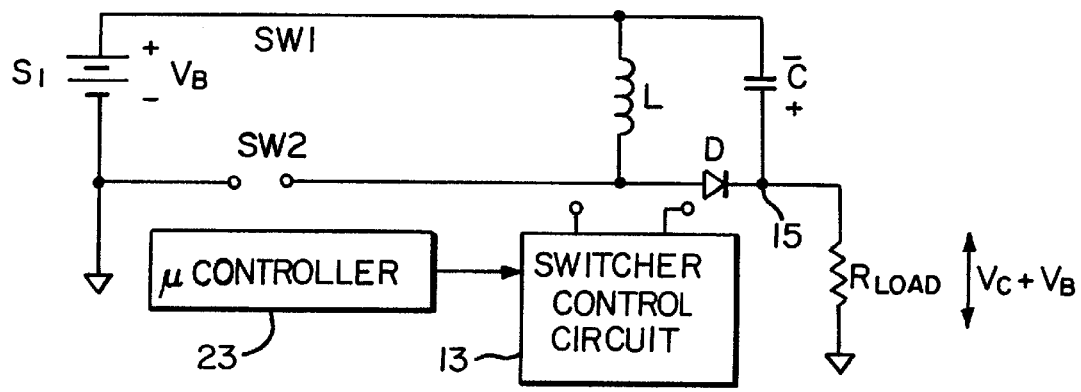
FIG. 4 is an equivalent circuit diagram illustrating operation of the circuit of FIG. 1 during signal transmission.

During signal transmission, the switch SW1 is closed and the switch SW2 is opened by appropriate application of the control signals. The resulting circuit is illustrated in FIG. 4. In this circuit, the capacitor C is switched in series with the battery S1, resulting in a stepped-up voltage of $V_C+V_B$ being applied across the load $R_{LOAD}$. The interval of application of this voltage may constitute the "transmit" time slot of the GSM portable phone protocol, while the sum of $V_C+V_B$ may be selected to be 5 volts.

In a particular embodiment of the circuit of FIG. 2, the inductor L may have a value on the order of 33 $\mu$H, and the switches SW1 and SW2 may comprise field effect transistor switches. Switch SWI may also be physically formed as part of the switch control circuit chip 13, which can result in particularly efficient operation. The capacitor C may be physically much smaller than prior art embodiments because the voltage it must carry is considerably less than such embodiments wherein the capacitor is required to store the entire source voltage. Also, since the working voltage on the capacitor is smaller in the preferred embodiment, the preferred embodiment exhibits efficiency greater than that of the circuit of FIG. 2. A typical value for such a capacitor is 2200 $\mu$ Farads. Thus, much smaller and less expensive parts may be used according to the preferred embodiment without voltage supply performance degradation.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A voltage upconverter circuit, comprising:

a voltage source providing a DC source voltage;

a low-voltage capacitor for holding a stored voltage, the capacitor being connected to a load by a first end;

a first switch connected between a second end of the capacitor and the voltage source, the switch being responsive to a first control signal for closing and establishing a series connection between the capacitor and the voltage source;

an inductor in series with a diode connected across the first and second ends of the capacitor, the inductor connected to the second end, and the diode connected to the first end of the capacitor; and a second switch connected between the junction of the inductor and diode and ground, the second switch being responsive to a second control signal for opening and closing, causing the capacitor to charge during the times the first and second switches are closed.

2. The voltage up-converter circuit of claim 1 further comprising a controller circuit for concurrently causing the first switch to alternately open and close and the second switch to connect the inductor to ground, causing the capacitor to charge when the second switch connects the inductor to ground, and the first switch is closed.

3. The circuitry of claim 1 further comprising a controller circuit for concurrently causing the first switch to close and the second switch to open, disconnecting the inductor from ground and connecting the capacitor in series with the DC voltage source thereby applying the sum of the voltage from the DC source voltage and the capacitor to the load.

4. A voltage upconverter circuit of increased efficiency comprising:

a DC voltage source having first and second terminals;

a capacitor having first and second terminals;

a first switch connected to the first terminals of the voltage source and the capacitor;

a switching voltage regulator connected in parallel with the capacitor and the first switch, for opening an closing the first switch; and a second switch connected to the second terminal of the DC voltage source and to the capacitor and actuable for charging the capacitor when the first and second switches are closed, or summing the voltage of the capacitor and DC voltage source when the first switch is closed and the second switch is open.

5. The circuitry of claim 4 further comprising a circuit for concurrently causing the switching voltage regulator to alternately open and close the first switch and said second switch to close thereby causing the capacitor to charge.

6. The circuitry of claim 4 further comprising a circuit for causing the switching voltage regulator to close the first switch and at the same time causing the second switch to open, thereby causing the summing of voltages on the capacitor and the DC voltage source.

7. The circuitry of claim 5 wherein the concurrently causing circuit causes the switching voltage regulator to close the first switch and at the same time causing the second switch to open, thereby causing the summing of voltages on the capacitor and the DC voltage source.

8. A voltage upconverter circuit, comprising:

a DC voltage source having first and second terminals;

a low voltage capacitor having first and second terminals;

a first switch connected to the first terminal of the voltage source and the first terminal of the capacitor;

a second switch connected to the second terminal of the DC voltage source and to the capacitor; and a controller for actuating the first and second switches to open and close, causing the capacitor to charge when the first and second switches are closed, and summing the voltages of the capacitor and DC voltage source when the first switch is closed and the second switch is open.

* * * * *